(12) United States Patent
Colon et al.

(10) Patent No.: US 12,079,574 B1
(45) Date of Patent: Sep. 3, 2024

(54) ANOMALOUS SOURCE DETECTION IN HIGH-DIMENSIONAL SEQUENCE DATA

(71) Applicant: Amazon Technologies, Inc., Seattle, WA (US)

(72) Inventors: Brendan Cruz Colon, Seattle, WA (US); Jason L. Thalken, Woodland Hills, CA (US); Aaron Boswell, Draper, UT (US); Matthew Michael Sommer, Issaquah, WA (US); Kellen K. Axten, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 467 days.

(21) Appl. No.: 17/541,833

(22) Filed: Dec. 3, 2021

(51) Int. Cl.
| | |
|---|---|
| *G06V 30/40* | (2022.01) |
| *G06F 18/211* | (2023.01) |
| *G06F 18/214* | (2023.01) |
| *G06F 40/279* | (2020.01) |
| *G06N 7/01* | (2023.01) |

(52) U.S. Cl.
CPC ......... *G06F 40/279* (2020.01); *G06F 18/211* (2023.01); *G06F 18/214* (2023.01); *G06N 7/01* (2023.01)

(58) Field of Classification Search
CPC ............ G06N 3/04; G06N 20/00; G06N 3/08; G06N 99/00; G06N 3/044; G06N 3/047; G06N 5/04; G10L 15/06; G10L 15/18; G10L 15/14; G10L 15/02; G10L 15/10; G10L 15/22; G10L 15/19; G10L 15/197; G10L 15/00; G10L 15/16; G10L 15/26; G10L 15/01; G10L 15/08; G10L 15/183; G10L 15/32; G06F 21/54; G06F 21/62; G06F 40/30; G06F 16/35; G06F 17/18; G06F 40/289; G06T 1/60; G06T 1/00; G06T 1/20; G06T 11/60
See application file for complete search history.

(56) References Cited

U.S. PATENT DOCUMENTS

| | | | | |
|---|---|---|---|---|
| 11,152,084 | B2 * | 10/2021 | Kondadadi | ............ G16Z 99/00 |
| 2019/0286700 | A1 * | 9/2019 | Jayaraman | ............ G06F 16/334 |
| 2020/0097563 | A1 * | 3/2020 | Alexander | ............ G06F 16/61 |
| 2020/0327590 | A1 * | 10/2020 | Handelman | ........ G06Q 30/0609 |

\* cited by examiner

*Primary Examiner* — Quan M Hua
(74) *Attorney, Agent, or Firm* — K&L Gates LLP

(57) ABSTRACT

Devices and techniques are generally described for evaluation of text data using large n-grams. In various examples, a first vector may be generated for first text data, wherein each element of the vector comprises a value indicating whether the first text data includes a respective n-gram included in a corpus of text data. First label data indicating that a user associated with the first text data has connected to a first computer-implemented service more than a threshold number of times during a past time period may be determined. A first machine learning model may be trained based at least in part on the first vector and the first label data. The first machine learning model may be used to determine a first probability associated with a first n-gram of the first vector. In some examples, at least a first user associated with the first n-gram may be determined.

20 Claims, 7 Drawing Sheets

ANOMALOUS SOURCE DETECTION IN HIGH-DIMENSIONAL SEQUENCE DATA

BACKGROUND

Detection of patterns and/or topics in text can be automated to perform a variety of tasks. In many automated approaches to text evaluation and/or classification large amounts of text data is needed to train models to evaluate, detect, and/or classify the text. However, for some problems, large amounts of appropriate training data may not be available.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Machine learning models may be trained for a variety of tasks. One such task is evaluation of high-dimensional sequence data, such as text data. Text data may be evaluated to classify, describe, and/or summarize various aspects of the text (e.g., to determine whether a user review is positive or negative, to provide a summary of text, to determine various entities that are being referred to in the text data, etc.). Described herein are various systems and techniques that may be used to link the usage of various phrases (e.g., "large" n-grams where n≥5) with user accounts that connect to a particular computer-implemented service greater than a threshold number of times within a predefined past time period (e.g., >1 time within the past 24 hours, the past week, the past 30 days, 60 days, etc.). The particular systems and techniques discussed herein describe a novel way to link text data to particular types of usage of computer-implemented services and can be used to train other machine learning models and/or modify routing decisions for identified requests. In various further examples, the techniques described herein may be used to determine information about a source of the text data based on highly-predictive n-grams included in the text. For example, the techniques may determine that a particular source is anomalous based on particular n-grams that are used in text data generated by that source.

Figure 1:
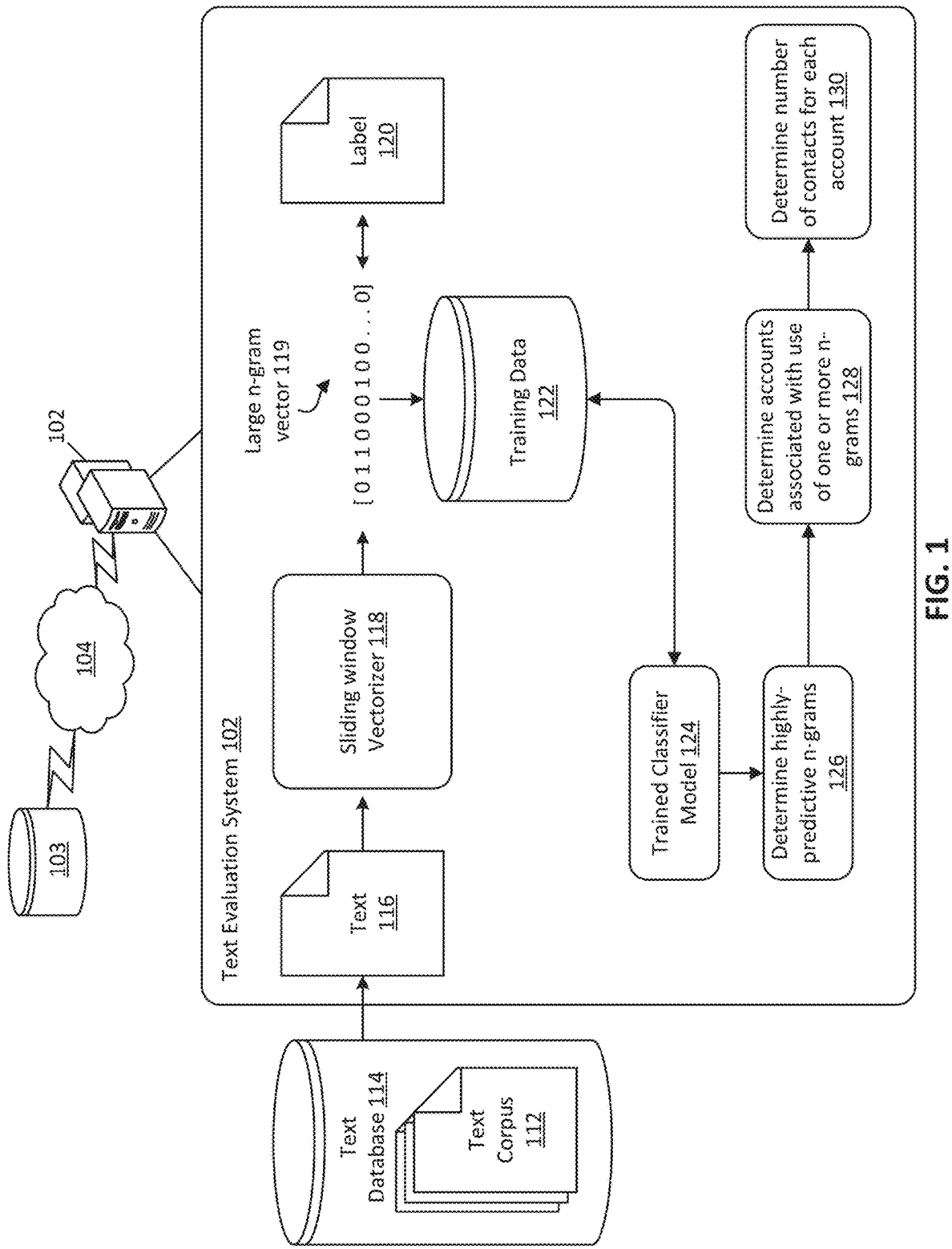
FIG. 1 is a block diagram illustrating a text evaluation system, according to various embodiments of the present disclosure.

FIG. 1 is a block diagram illustrating a text evaluation system 102, according to various embodiments of the present disclosure. In various examples, one or more computing devices may implement the text evaluation system 102. In examples where more than one computing device implements the text evaluation system 102, the different computing devices may communicate with one another over a network 104. For example, a remote computing device (and/or remote system of computing devices) may communicate with text evaluation system 102 via an application programming interface (API) as a cloud-based service.

In various examples, each of the one or more computing devices used to implement text evaluation system 102 may comprise one or more processors. The one or more computing devices used to implement text evaluation system 102 may be configured in communication with at least one non-transitory computer readable memory 103 ("memory 103"). In at least some examples, the one or more computing devices used to implement text evaluation system 102 may communicate with memory 103 over network 104. The memory 103 may store computer-readable instructions that, when executed by at least one processor of the one or more computing devices implementing text evaluation system 102, may be effective to program the one or more processors to perform the various text evaluation techniques and/or execute the various algorithms described herein.

In various examples, network 104 is a wide area network, such as the Internet, while in other embodiments, the network 104 is a local area network (LAN) over which requests may be received. In some further embodiments, network 104 is a combination of the Internet and a LAN.

The text evaluation system 102 depicted in FIG. 1 is able to perform various different techniques. In some cases, the techniques may be combined, as is shown in the example. However, the techniques may also be used separately. For example, the text evaluation system 102 shown in FIG. 1 may be effective to detect accounts associated with usage of various n-gram phrases that are determined to be highly-correlated with high usage of computer-implemented services (e.g., chat-based interfaces).

A text database 114 may comprise a text corpus 112 that may include a plurality of text documents. In various examples, the text corpus 112 may be pre-processed in various ways prior to inputting each text document (such as text data 116) into the text evaluation system 102. For example, documents of text corpus 112 may be two-way (or multi-way) text-based conversations. In an example, the pre-processing may include scrubbing the text to remove all words attributed to one or more parties, so that only text attributable to a single party remains. In various further example, other pre-processing techniques may be performed to the text corpus 112. Some examples may include stop-word removal, lemmatization, stemming, etc. After pre-processing the resulting text data 116 may be provided to sliding window vectorizer 118. The text corpus 112 (after pre-processing) may be parsed to determine n-gram phrases that appear in ≥ some minimum document frequency (DF) and/or ≤ some maximum DF. The particular thresholds may be selected based on the specific implementation. A vector representation may be generated, where each element of the vector corresponds to one of the n-gram phrases that satisfy the relevant DF thresholds. An n-gram refers to n consecutive words in the text (or in the preprocessed text data).

After defining the vector representation, the sliding window vectorizer 118 may evaluate each document of text data (of which text data 116 is an example) and may output a large n-gram vector 119. The large n-gram vector 119 may be a binary vector. Accordingly, a value of 1 at a first element of the large n-gram vector 119 may indicate that the n-gram associated with the first element of the vector representation is present in the text data being evaluated. Similarly, a value of 0 at the first element may indicate that the n-gram is not present in the text data. It should be noted that the definition of the values 0 and 1 may be switched (with 0 indicating the presence of the n-gram and 1 indicating the absence of the n-gram), if so desired.

The value of n (for the n-grams) may be $\geq 5$ (e.g., 6, 7, 8, . . . ). The sliding window vectorizer 118 may evaluate each n-token phrase (e.g., each n-word phrase) to determine whether the n-token phrase corresponds to a phrase in the vector representation. The window of the sliding window vectorizer 118 may then "slide" by a predefined amount to evaluate the next n-token phrase. The sliding window vectorizer 118 may slide by a token (e.g., a word) in order to detect which, if any, n-grams of the vector representation are present in the text being vectorized.

For example, where n=5, the input text may be:

Sometimes she and Miss Baker talked at once, unobtrusively and with a bantering inconsequence that was never quite chatter, that was as cool as their white dresses and their impersonal eyes in the absence of all desire.

The window where n=5 may initially be around the text [Sometimes she and Miss Baker] (note that stop words may not be removed in this example, for ease of illustration). If the phrase "Sometimes she and Miss Baker" is one of the 5-grams of the vector representation, the sliding window vectorizer 118 may represent this 5-gram with a 1 at the position of the vector that is associated with "Sometimes she and Miss Baker." Subsequently, the window may advance by one token to [she and Miss Baker talked]. Again, if the phrase "she and Miss Baker talked" is one of the 5-grams of the vector representation, the sliding window vectorizer 118 may represent this 5-gram with a 1 at the position of the vector that is associated with "she and Miss Baker talked". This process may continue through the rest of the text data to generate large n-gram vector 119 representing the text data 116.

Each large n-gram vector 119 may be associated with a label 120. In various examples, the label 120 may represent whether account data associated with the large n-gram vector 119 connected to a particular computer-implemented service more than a threshold number of times during a predefined past time period. For example, if the input text data is associated with a user account that has connected to a first computer-implemented service more than one time in the past two days, the label 120 may be 1, and 0 otherwise. The particular thresholds used and the particular label definitions may be implementation specific.

Each large n-gram vector 119 may be paired with its label 120 and may be stored as training data 122 (e.g., in a data store). After a sufficient amount of training data 122 is generated, the training data 122 may be used to train a classifier model. For example, the training data 122 may be used to train a multi-nomial Naïve Bayes classifier, a Gaussian classifier, a Bernoulli-based classifier, etc. The trained classifier model 124 may be trained to output a confidence score (e.g., a probability) indicating a likelihood that text corresponds to the label 120 (the text being vectorized as an un-labeled large n-gram vector 119). However, it should be noted that prediction using the trained classifier model 124 may not be the intended use of the model. As such, carefully devising training and test data sets, using cross validation, etc., to avoid overfitting of the model may not be of concern. Instead, as described in further detail below, the trained classifier model 124 may instead be used to determine the features (e.g., the individual n-grams of the large n-gram vector representation) that contribute the most to a prediction label of interest. In an example, the prediction label of interest may be a label indicating that an account connected to a particular computer-implemented service greater than a threshold number of times within a predefined past time period. Accordingly, at block 126, the text evaluation system 102 may determine highly-predictive n-grams. The highly-predictive n-grams may be determined using the conditional probability that the label will be generated given the presence of a particular n-gram (e.g., $P(label|n\text{-}gram_Z)$). Those n-grams associated with a probability that is over a threshold may be selected as the highly-predictive n-grams. The threshold probability may be empirically determined or otherwise selected for the particular instantiation of text evaluation system 102.

After determining the highly-predictive n-grams, accounts that have included one or more of the highly-predictive n-grams in text data may be determined at block 128 (using historical data, such as text corpus 112). Optionally, processing may continue to block 130 where a number of contacts over a predefined past time period (e.g., a number of times connection to a computer-implemented service was requested/performed) may be determined for each of the accounts that were determined at block 128. In various examples, the accounts may be prioritized for follow up action and/or investigation based on the account using the highly-predictive n-grams and/or based on the number of contacts associated with the account over the predefined past time period. In some cases, accounts may be suspended automatically, may be routed to different computer-implemented services (e.g., services used to deal with high volume accounts), etc. In some further examples, a confidence score indicating model confidence that an entity has contacted a computer-implemented service greater than a threshold number of times over the relevant past time period may be ingested as a signal to another model that is used to route the particular user/account (e.g., to a different computer-implemented service) and/or that is used to determine an appropriate action to take for the particular user/account. The particular action to be taken may also be implementation specific and highly dependent on the goal and/or use case.

One possible use of the text evaluation system 102 may be detection of concession abuse fraud in text data. Concession abuse is a common fraud tactic wherein a bad actor contacts customer service and requests some concession (e.g., a refund, account credit, etc.). Such concessions may result in large amounts of loss for e-commerce entities. Concession abuse fraud may be difficult to detect and/or stop as it is a low velocity, high-payout scheme only requiring one concession on a high-value item to yield a large amount of money (e.g., potentially hundreds of dollars) in a single successful attempt. Low-velocity fraud also means that patterns in request data are less likely to capture fraudsters as a shallow pool of dissimilar user IDs/IP addresses/email domains/device types can allow for multiple concession attempts before a pattern is detectable (e.g., using traditional machine learning approaches).

There are two apparent bottlenecks to chat-mediated concessions abuse: 1) accounts have to appear legitimate, and 2) fraudsters have to interact with a human agent to request the concession. The need for accounts to appear legitimate (to perpetrate concession abuse fraud) is a constraint because it should, in theory, prevent newly-created accounts from requesting concessions en masse. As a result of this, it has been observed that accounts associated with concession abuse fraud are often reused. The need to interact with a human agent to request the concession is a constraint because it is tedious. Because of this, large phrases are often conserved in chat fraud, perhaps as a result of automation or fraud protocol. Accordingly, text evaluation system 102 may use the appearance of various large phrases (e.g., the large n-grams described herein) to correlate such phrases with accounts that frequently contact chat-based customer service. Note that use of text evaluation system 102 in this context is scalable, fast, and is language agnostic. More generally, the text evaluation system 102 may be used for anomalous source detection in high-dimensional sequence data (such as text). For example, the text evaluation system 102 may be used to detect that an automated system generated text as opposed to a human. Similarly, the text evaluation system 102 may be used to determine that text is human-generated. The text evaluation system 102 may provide information concerning the source of text (or other sequence data) based on the particular large n-grams used in the text. More specifically, the text evaluation system 102 may provide information about the relative rigidity or flexibility of the large n-grams that the source is capable of generating and whether the source uses large n-grams generated by other sources (particularly sources associated with high volume usage of computer-implemented services).

Figure 2:
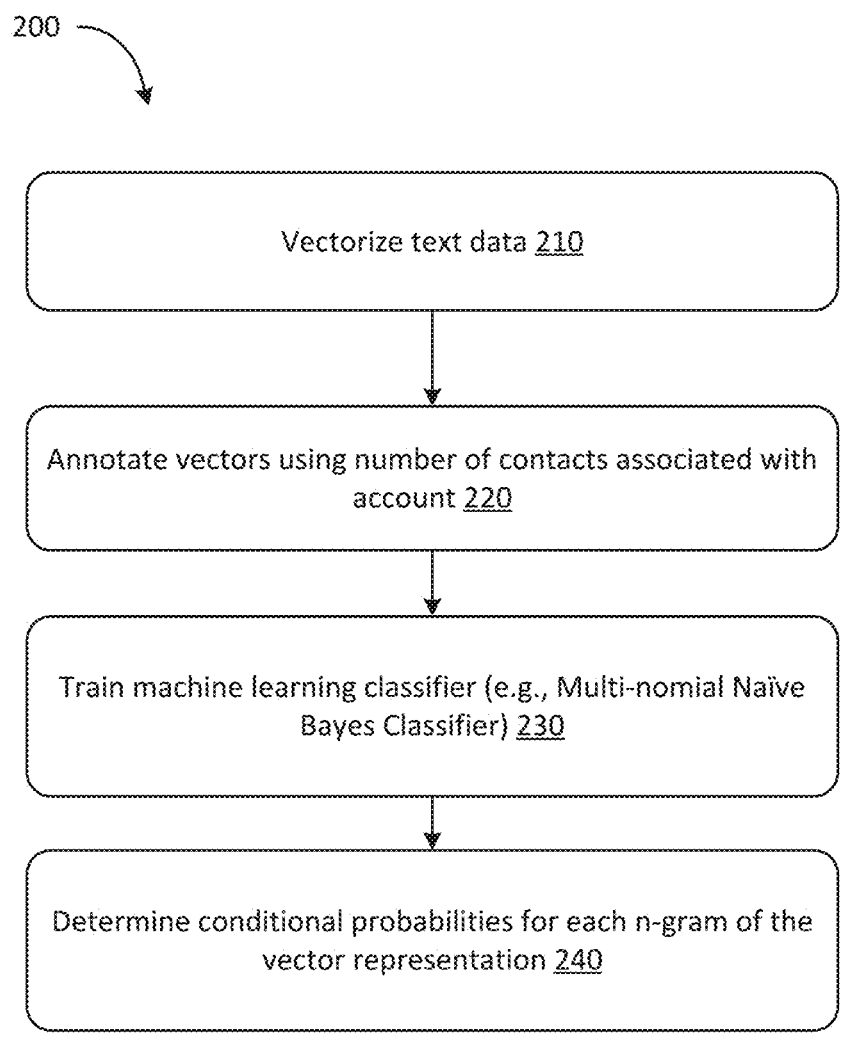
FIG. 2 is a flow diagram illustrating an example process for determining conditional probabilities for n-gram text data, in accordance with various embodiments of the present disclosure.

FIG. 2 is a flow diagram illustrating an example process 200 for determining conditional probabilities for n-gram text data, in accordance with various embodiments of the present disclosure. The process 200 of FIG. 2 may be executed by one or more computing devices. The actions of process 200 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 200 may be described above with reference to elements of FIG. 1. Although shown in a particular order, the steps of process 200 may instead be performed in a different order. Additionally, various steps may be performed in parallel in various implementations. Further, some steps may be omitted and/or other steps may be added in accordance with the text evaluation techniques described herein.

Process 200 may begin at action 210, at which input text data may be vectorized. As previously described, sliding window vectorizer 118 may be used to generate large n-gram vectors 119 for each input text data (e.g., a preprocessed text transcript). Each element of the vector representation that is generated by the sliding window vectorizer 118 may represent a different n-gram from the text corpus 112 (e.g., n-gram phrases that appear in ≥ some minimum document frequency (DF) and/or ≤ some maximum DF).

Process 200 may continue at action 220, at which the resulting vectors may be annotated using the number of contacts associated with the particular account. For example, a first text transcript may be associated with a first account (e.g., an account that was logged in and by which the text was entered). Data may be available that indicates that the first account connected to a particular computer-implemented chat portal 43 times in the last 60 days. In various cases, accounts that contacted the chat portal more than 1 time in the last 60 days may be labeled with first label data (e.g., a 1), whereas accounts that contacted the chat portal 1 time or less within the last 60 days may be labeled with second label data (e.g., a 0). As previously noted, the particular thresholds and label data values may be different depending on the desired implementation. Accordingly, the foregoing example is merely for illustrative purposes.

Process 200 may continue at action 230 at which a machine learning classifier (e.g., a multi-nomial Naïve Bayes classifier) may be trained using the annotated vectors. In the current example, the machine learning classifier may classify input vectorized text (e.g., vectorized by the sliding window vectorizer 118) by generating a confidence score indicating a likelihood that an input transcript is associated with an account that has contacted the chat portal more than one time in the last 60 days.

Process 200 may continue at action 240 at which conditional probabilities (e.g., log probabilities) may be determined for each n-gram of the vector representation used by the sliding window vectorizer 118 using the trained machine learning classifier. As described in further detail below, a vector representing each n-gram phrase (e.g., where the element for the n-gram being evaluated is activated and all other vector elements are inactivated) may be input into the trained machine learning classifier to determine the conditional probability for that n-gram. N-grams having a conditional probability (or log probability) that exceeds a probability threshold may be deemed the highly-predictive n-grams for the model's prediction that text including any of such n-grams is generated by accounts that have connected to the chat portal more than one time in the past 60 days.

Figure 3:
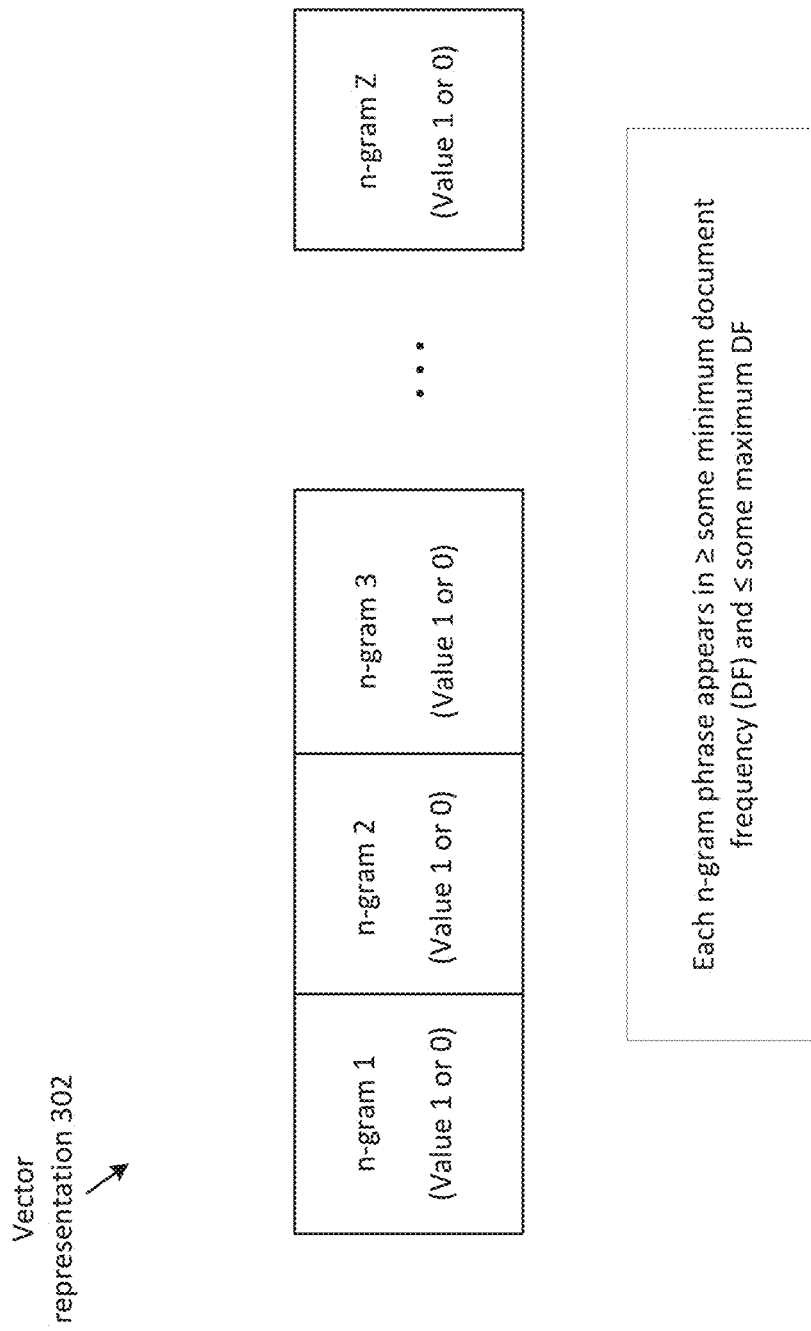
FIG. 3 depicts an example of a vector representation for use with a classifier model, in accordance with various aspects of the present disclosure.

FIG. 3 depicts an example of a vector representation 302 for use with a classifier model, in accordance with various aspects of the present disclosure. As previously described, each element of the vector representation may represent a particular n-gram. Accordingly, as shown in FIG. 3, n-gram 1 is represented by a first vector element, n-gram 2 is represented by a second vector element, and so on. Each element of a vector generated by sliding window vectorizer 118 according to the vector representation 302 may have a binary value indicating whether the respective n-gram was present in the input text data. As noted in FIG. 3, the n-grams selected for representation from the text corpus 112 may be those n-gram phrases that appear in ≥ some minimum document frequency (DF) and/or ≤ some maximum DF.

Figure 4:
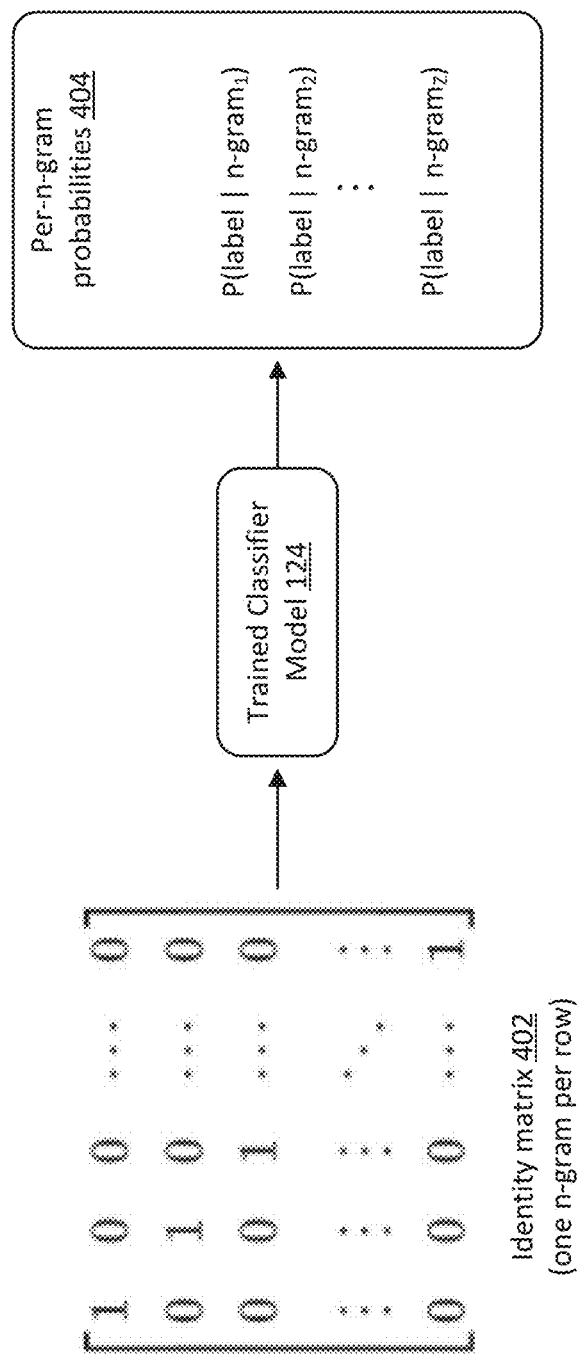
FIG. 4 depicts determination of conditional probabilities for n-gram text data, in accordance with various aspects of the present disclosure.

FIG. 4 depicts determination of conditional probabilities for n-gram text data, in accordance with various aspects of the present disclosure. As shown, a data set may be generated comprising identity matrix 402. Each column of the identity matrix 402 represents an n-gram of the vector representation 302. However, in identity matrix 402, only a single n-gram is activated (with a value of 1) in each row. Accordingly, the trained classifier model 124 generates per-n-gram probabilities 404 by generating a prediction for each row of the identity matrix 402. As shown, per-n-gram probabilities 404 include the probability that an account that has used the respective n-gram in text has connected to the chat portal (or other computer-implemented service) more than a threshold number of times during a pre-defined past time period (e.g., $P(label|n\text{-}gram_1)$, $P(label|n\text{-}gram_2)$, ..., $P(label|n\text{-}gram_Z)$). As previously described, the highest conditional probabilities and/or the probabilities that exceed a probability threshold may be considered highly predictive of an account contacting the service more than the threshold number of times during the predefined time period. Once these highly-predictive n-grams are determined, accounts that have used one or more of these n-grams may be determined. These accounts may be flagged for follow-up. Additionally, these accounts may be sorted based on the number of times that they have actually contacted the computer-implemented service during the past time period.

Figure 5:
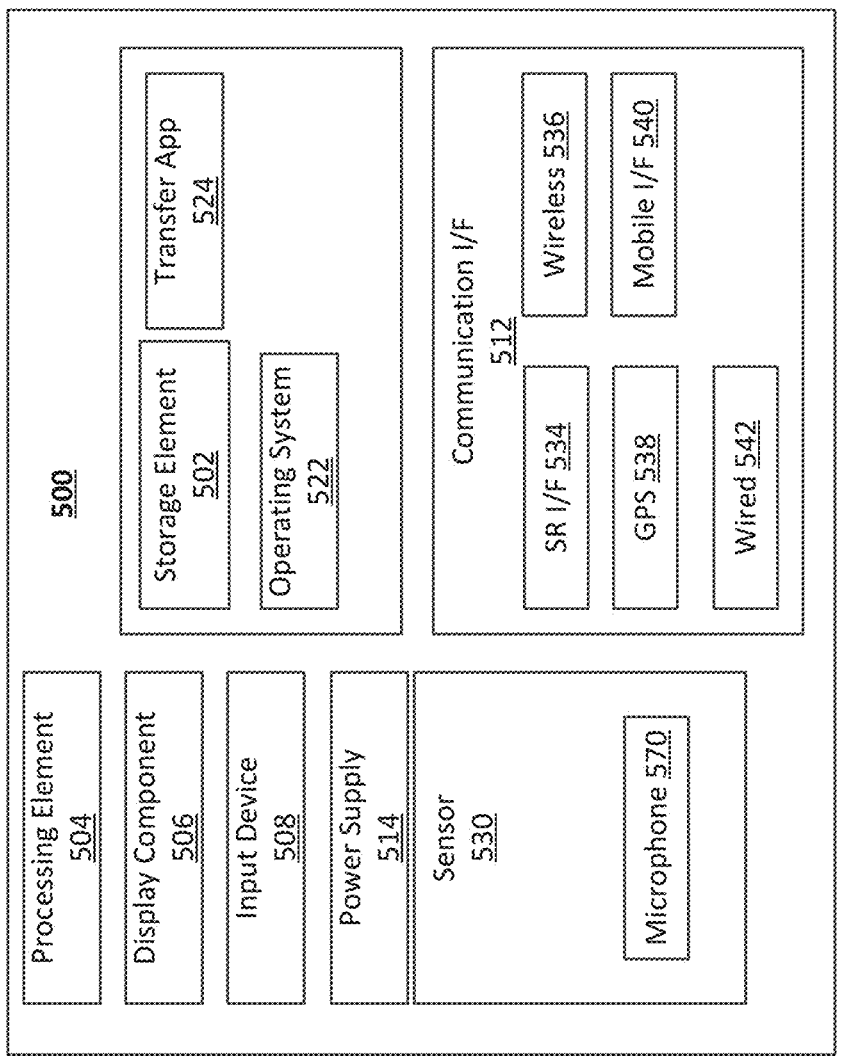
FIG. 5 is a block diagram showing an example architecture of a computing device that may be used in accordance with various embodiments described herein.

FIG. 5 is a block diagram showing an example architecture 500 of a computing device that may be used to implement, at least in part, a text evaluation system 102, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
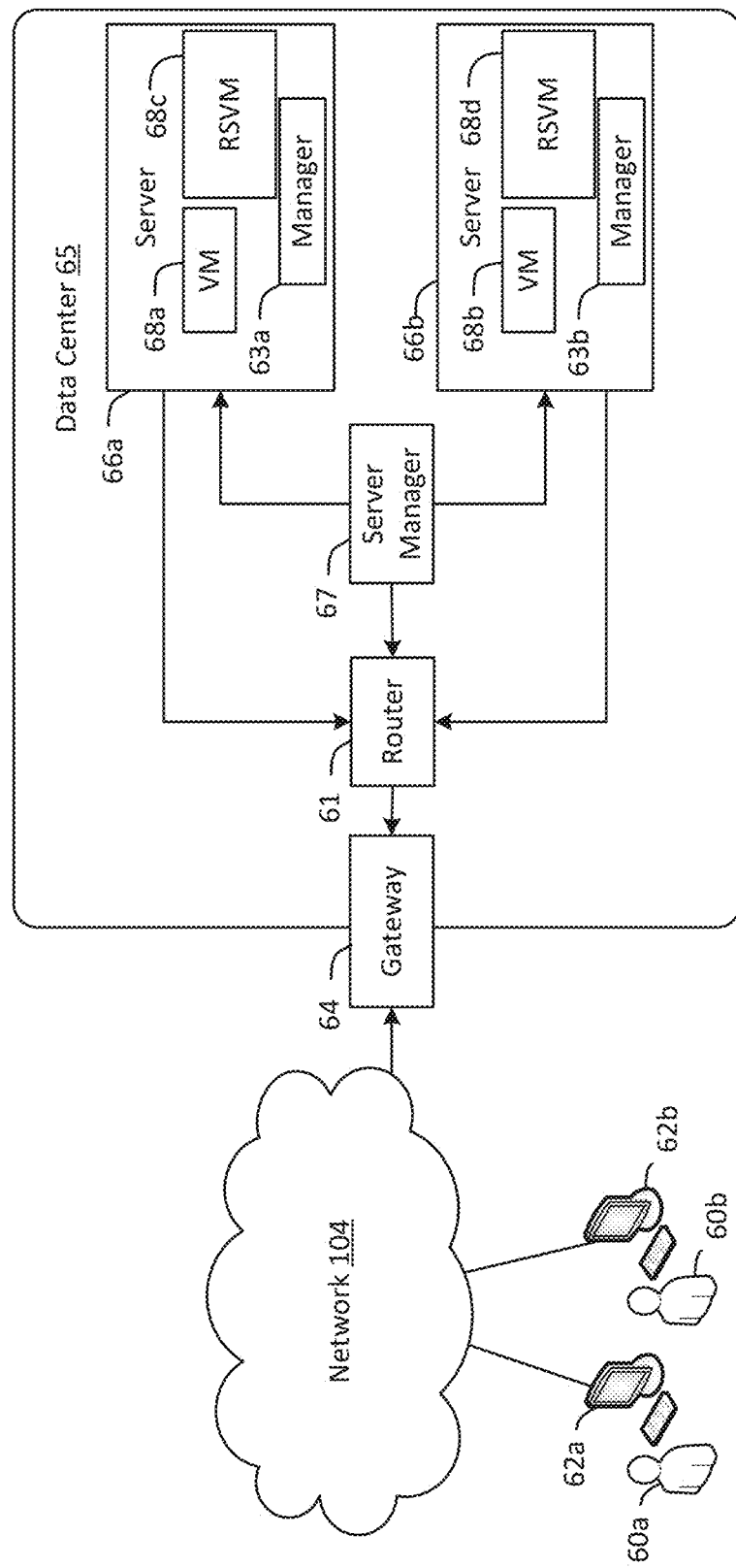
FIG. 6 is a diagram illustrating an example system for sending and providing data that may be used in accordance with the present disclosure.

An example system for implementing a peer-based unused rights detection system will now be described in detail. In particular, FIG. 6 illustrates an example computing environment in which the embodiments described herein may be implemented. For example, the computing environment of FIG. 6 may be configured to provide text evaluation as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
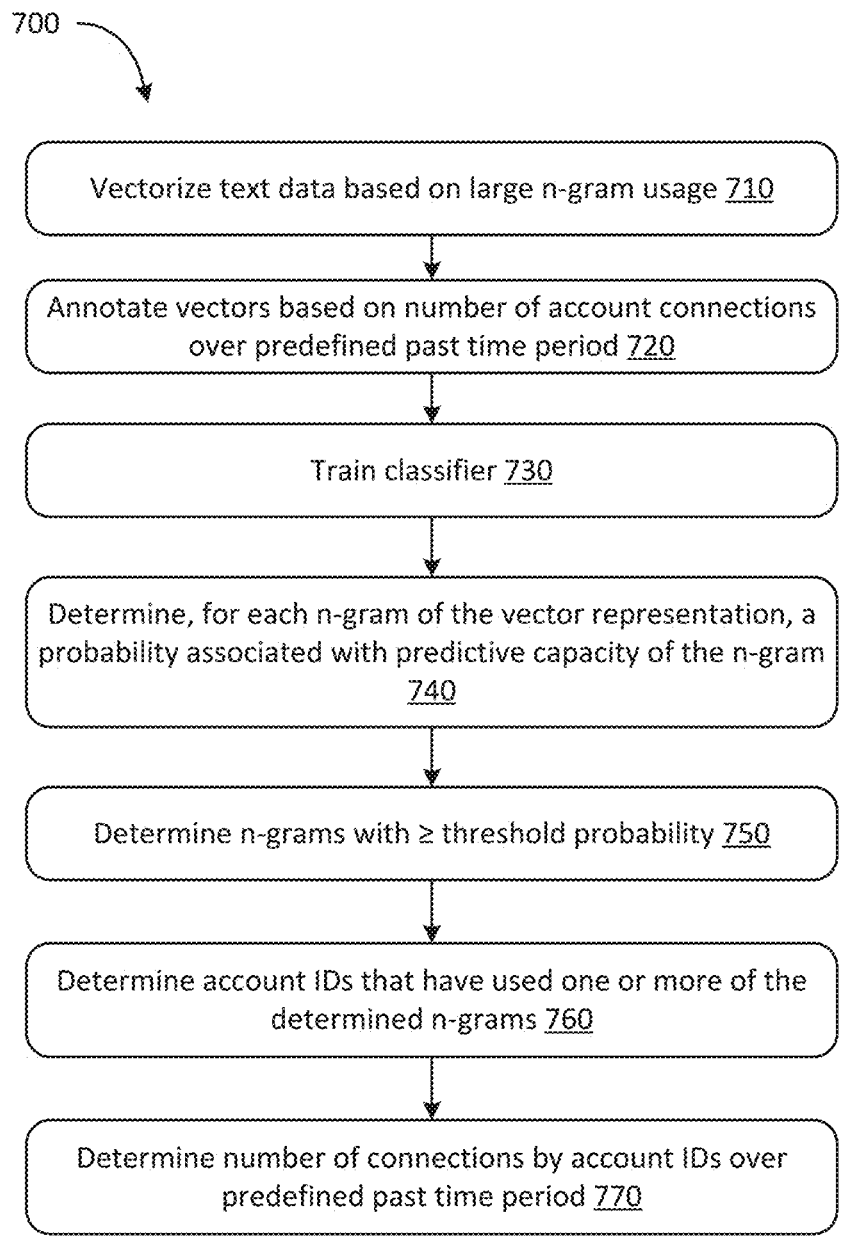
FIG. 7 is a flow diagram illustrating an example process for performing text evaluation using large n-grams, according to various techniques described herein.

FIG. 7 is a flow diagram illustrating an example process 700 for performing text evaluation using large n-grams, according to various techniques described herein. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6. Although shown in a particular order, the steps of process 700 may instead be performed in a different order. Additionally, various steps may be performed in parallel in various implementations. Further, some steps may be omitted and/or other steps may be added in accordance with the text evaluation techniques described herein.

Process 700 may begin at action 710, at which text data may be vectorized based on large n-gram usage. For example, each input text may be parsed to determine if the text includes any large n-grams determined for the vector representation 302 (e.g., where n≥5). As previously described, the vectorizer may use a sliding window to crawl the input text data and may generate a fixed-size vector indicating which n-grams among those of the vector representation are found in the text data.

Processing may continue at action 720, at which the vectors generated at action 710 may be annotated based on the number of account connections over a predefined past time period. For example, a vector associated with an account that has connected to a first computer-implemented service more than one time (or more than some other threshold number of times) over the predefined past time period may be labeled with 1, while a vector associated with an account that has connected to the first computer-implemented service ≤ one time (or other relevant threshold) may be labeled with 0.

Processing may continue at action 730, at which the vector/label pairs generated at actions 710 and 720 may be used to train a machine learning classifier. In various examples, a multinomial Naïve Bayes classifier, a Gaussian classifier, a Bernoulli-based classifier, a neural network, etc., may be used.

Processing may continue at action 740, at which a probability may be determined for each n-gram of the vector representation. The probability represents the probability that a first label is generated given that text includes that n-gram. In this example, the label is whether the account associated with the text has connected to the first computer-implemented service more than the threshold number of times over the predefined past time period.

Processing may continue at action 750, at which the n-grams that have a probability (e.g., a log probability) over a probability threshold value may be determined. In various examples, these n-grams may be highly associated with concession abuse fraud and/or with users connecting to the first computer-implemented service more than the threshold number of times over the predefined past time period.

Processing may continue at action 760, at which account IDs (e.g., a list of accounts) that have used one or more of the n-grams with probabilities that exceed the probability threshold may be determined. This may be a lookup operation which may include querying text transcripts using the highly-predictive n-grams to see which text transcripts include one or more of the highly-predictive n-grams. The account IDs associated with these text transcripts may be determined.

Processing may continue at action 770, at which a number of connections by account IDs over a predefined past time period may be determined. In various examples, this action 770 may be optional. However, determining those account IDs that have connected to the first computer-implemented service the most times over the predefined past time period may be used to prioritize remedial actions such as account suspension, account investigation, and/or future routing of these account IDs to an alternate computer-implemented service (e.g., one where concessions are not provided in the concession abuse example). In some cases, such account IDs may be denied connection to the first computer-implemented service in the future (and/or for a given time period).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of text evaluation, the method comprising:
   determining a first vector representation, wherein each element of the first vector representation represents a respective n-gram appearing in a corpus of text data;
   receiving first text data;
   generating a first vector representing the first text data, wherein the first vector is of the first vector representation, wherein a value of each element of the first vector indicates whether the respective n-gram of that element is present in the first text data;
   generating first label data for the first text data, the first label data indicating that a first account associated with the first text data has connected to a first computer-implemented service more than one time during a predefined past time period;
   receiving second text data;
   generating a second vector representing the second text data, wherein the second vector is of the first vector representation, wherein the value of each element of the second vector indicates whether the respective n-gram of that element is present in the second text data;
   generating second label data for the second text data, the second label data indicating that a second account associated with the second text data has connected to the first computer-implemented service once during the predefined past time period;
   generating a trained Naïve Bayes classifier using the first vector labeled with the first label data and the second vector labeled with the second label data;
   determining, for a first n-gram of the first vector representation, a probability that the trained Naïve Bayes classifier generates the first label data for text including the first n-gram;
   determining third text data that includes the first n-gram;
   determining a number of times that an account associated with the third text data has connected to a first computer-implemented service during the predefined past time period;
   receiving a request to establish a connection to the first computer-implemented service, wherein the request is associated with the account; and
   routing the request to a second computer-implemented service based on the number of times exceeding a threshold number of times.

2. The computer-implemented method of claim 1, further comprising:
   determining a set of accounts associated with text data that includes the first n-gram; and
   routing requests received from the set of accounts to the second computer-implemented service that is different from the first computer-implemented service.

3. The computer-implemented method of claim 1, wherein n of the n-grams represents a number of consecutive words and wherein n is greater than or equal to five.

4. A method comprising:
   generating, for first text data, a first vector, wherein each element of the first vector comprises a value indicating whether the first text data includes a respective n-gram included in a corpus of text data;
   determining, for the first text data, first label data indicating that a user associated with the first text data has connected to a first computer-implemented service more than a threshold number of times during a past time period;
   training a first machine learning model based at least in part on the first vector and the first label data;
   determining, using the first machine learning model, a first probability associated with a first n-gram of the first vector; and
   determining at least a first user associated with the first n-gram.

5. The method of claim 4, further comprising:
   determining that the first probability exceeds a probability threshold, wherein the first probability represents a likelihood that text which includes the first n-gram will be labeled by the first machine learning model with the first label data.

6. The method of claim 4, further comprising determining a number of times that an account associated with the first user connected to a first computer-implemented service during the past time period.

7. The method of claim 6, further comprising:
   determining that the number of times exceeds a threshold number of times; and
   generating routing data associated with the account effective to route requests received from the account that are directed to the first computer-implemented service to a second computer-implemented service.

8. The method of claim 4, further comprising:
   determining, for each n-gram represented by the first vector, a respective probability;
   determining a set of n-grams associated with respective probabilities that are above a threshold value; and
   determining a list of accounts that have used any n-gram of the set of n-grams.

9. The method of claim 4, further comprising:
   generating a second vector, wherein the second vector comprises a 1 for a vector element corresponding to the first n-gram and a 0 for each other element of the second vector; and
   determining the first probability by inputting the second vector into the first machine learning model after training.

10. The method of claim 4, wherein n of the n-grams is greater than or equal to five.

11. The method of claim 4, further comprising:
    selecting a first set of n-grams that appear in greater than a minimum document frequency in the corpus of text data; and
    selecting, from among the first set of n-grams, a subset of n-grams that appear in less than a maximum document frequency in the corpus of text data, wherein each element of the first vector represents a respective one of the subset of n-grams.

12. The method of claim 4, further comprising:
determining a number of times that an account associated with the first user connected to a first computer-implemented service during the past time period;
determining that the number of times exceeds a threshold number of times;
receiving a request from the account to connect to a first computer-implemented service; and
denying the request.

13. A system comprising:
at least one processor; and
non-transitory computer-readable memory storing instructions that, when executed by the at least one processor, are effective to:
generate, for first text data, a first vector, wherein each element of the first vector comprises a value indicating whether the first text data includes a respective n-gram included in a corpus of text data;
determine, for the first text data, first label data indicating that a user associated with the first text data has connected to a first computer-implemented service more than a threshold number of times during a past time period;
train a first machine learning model based at least in part on the first vector and the first label data;
determine, using the first machine learning model, a first probability associated with a first n-gram of the first vector; and
determine at least a first user associated with the first n-gram.

14. The system of claim 13, the non-transitory computer-readable memory storing further instructions that, when executed by the at least one processor, are further effective to:
determine that the first probability exceeds a probability threshold, wherein the first probability represents a likelihood that text which includes the first n-gram will be labeled by the first machine learning model with the first label data.

15. The system of claim 14, the non-transitory computer-readable memory storing further instructions that, when executed by the at least one processor, are further effective to determine a number of times that an account associated with the first user connected to a first computer-implemented service during the past time period.

16. The system of claim 15, the non-transitory computer-readable memory storing further instructions that, when executed by the at least one processor, are further effective to:
determine that the number of times exceeds a threshold number of times; and
generate routing data associated with the account effective to route requests received from the account that are directed to the first computer-implemented service to a second computer-implemented service.

17. The system of claim 13, the non-transitory computer-readable memory storing further instructions that, when executed by the at least one processor, are further effective to:
determine, for each n-gram represented by the first vector, a respective probability;
determine a set of n-grams associated with respective probabilities that are above a threshold value; and
determine a list of accounts that have used any n-gram of the set of n-grams.

18. The system of claim 13, the non-transitory computer-readable memory storing further instructions that, when executed by the at least one processor, are further effective to:
generate a second vector, wherein the second vector comprises a 1 for a vector element corresponding to the first n-gram and a 0 for each other element of the second vector; and
determine the first probability by inputting the second vector into the first machine learning model after training.

19. The system of claim 13, wherein n of the n-grams is greater than or equal to five.

20. The system of claim 13, the non-transitory computer-readable memory storing further instructions that, when executed by the at least one processor, are further effective to:
select a first set of n-grams that appear in greater than a minimum document frequency in the corpus of text data; and
select, from among the first set of n-grams, a subset of n-grams that appear in less than a maximum document frequency in the corpus of text data, wherein each element of the first vector represents a respective one of the subset of n-grams.

* * * * *